United States Patent [19]
Gotto et al.

[11] 4,159,015
[45] Jun. 26, 1979

[54] DEVICE TO PREVENT UNAUTHORIZED USE OF COMBUSTION ENGINE DRIVEN VEHICLES, SHIPS, OTHER EQUIPMENT

[75] Inventors: Raymond J. Gotto; Christer Forsberg, both of Stockholm, Sweden

[73] Assignee: Telcefo Security Products AB, Hagersten, Sweden

[21] Appl. No.: 804,750

[22] Filed: Jun. 8, 1977

[30] Foreign Application Priority Data

Jun. 8, 1976 [SE] Sweden .............................. 7604232

[51] Int. Cl.² ........................................... F02B 77/00
[52] U.S. Cl. ............................ 123/198 B; 123/148 A; 180/114; 70/237
[58] Field of Search ........... 123/198 B, 148 A, 198 R; 180/114; 70/237, 231

[56] References Cited

U.S. PATENT DOCUMENTS

| | | | |
|---|---|---|---|
| 1,091,295 | 3/1914 | Combs | 123/198 B |
| 1,113,058 | 10/1914 | Schwitzer | 123/198 B |
| 1,140,317 | 5/1915 | Robinson | 123/198 B |
| 1,359,291 | 11/1920 | Tripp | 123/198 B X |
| 1,937,848 | 12/1933 | Shinn | 70/231 |
| 3,181,523 | 5/1965 | Casey | 70/237 X |
| 3,796,074 | 3/1974 | Vik | 70/231 |
| 3,978,698 | 9/1976 | Ono | 70/231 X |

Primary Examiner—Ira S. Lazarus
Attorney, Agent, or Firm—John C. Holman; Marvin R. Stern

[57] ABSTRACT

A method and a device to prevent unauthorized use of combustion engine driven vehicles, ships, equipment, as well as engines only, including the steps to remove at least one spark plug, to attach a device having an externally threaded part as replacement for the removed spark plug(s), said part having an embracing outside member, which by means of a locking mechanism can be brought into a freely rotatable state in relation to the threaded member, thus preventing removal of same, or, alternatively, bring said members into an interlocked relationship, thus enabling the device to be attached or removed from the engine.

12 Claims, 4 Drawing Figures

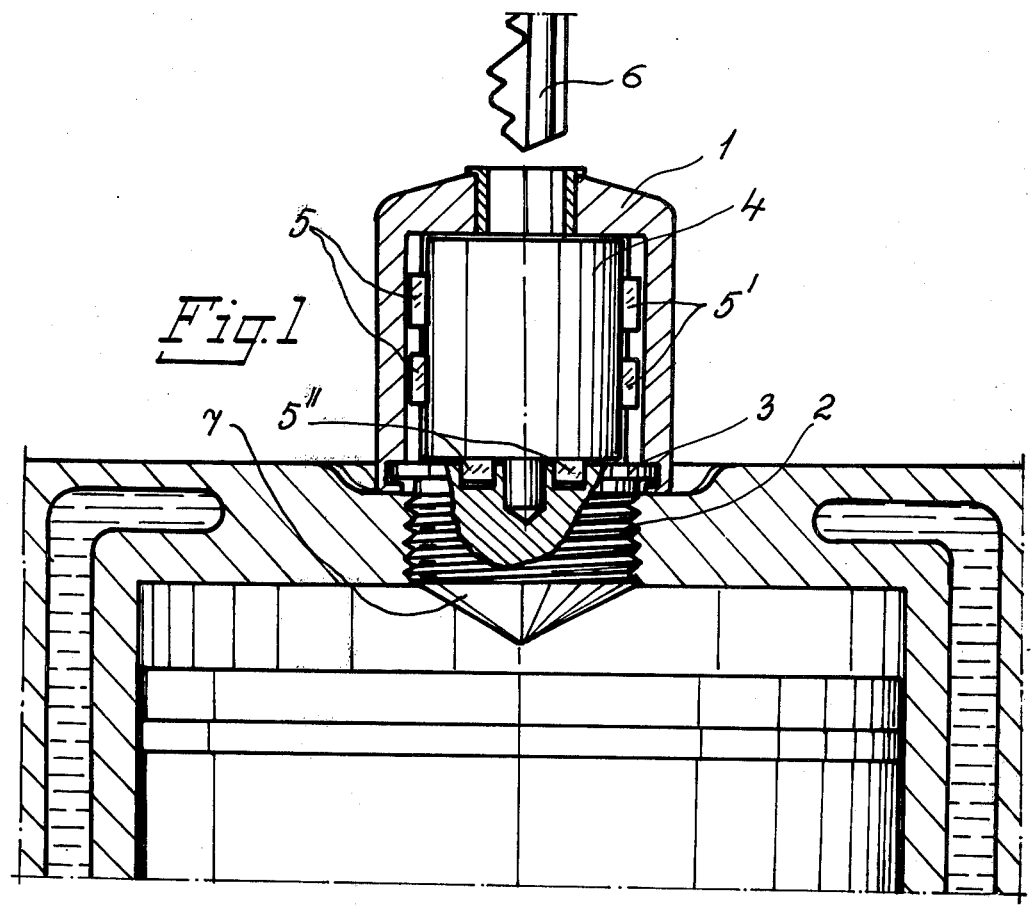
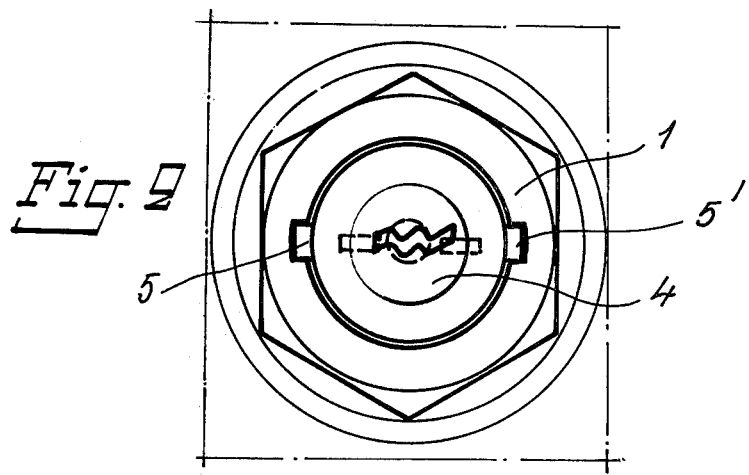

DEVICE TO PREVENT UNAUTHORIZED USE OF COMBUSTION ENGINE DRIVEN VEHICLES, SHIPS, OTHER EQUIPMENT

The present invention relates to a method to prevent unauthorized use of combustion engine driven vehicles, ships, other equipment, as well as combustion engines only, and a device according to the method.

It is previously known a demand for a method to prevent theft of combustion engine driven vehicles, equipment, ships and other devices, e.g. theft of cars, mopeds, motor-cycles, small maritime crafts etc., which are very desirable, since they can easily be transported away from one location to another, whereafter existing locking devices are brought out of function.

The object of the present invention is to disclose a method to establish an effective protection against unauthorized use, e.g. in connection with theft, thus indirectly acting as a theft prevention protection, since theft does not make it possible to use the stolen object. The present invention also concerns a device, intended to be attached to a combustion engine, which makes it possible to utilize the method.

Previously known methods to prevent use of vehicles or other objects propelled by combustion engines include conventional locking devices, e.g. steering wheel locks, gear stick locks and locking means for a wheel of a moped or a motor-cycle, locking means preventing removal of outboard engines and other similar locking devices, and locking devices for the ignition, which prevent closing of the electrical circuit of the ignition system if a key belonging to the lock is not available. The last mentioned type of locks can be easily by-passed with respect to the ignition circuit, and the circuit to the the electrical starter motor can also easily be by-passed for those cases, when the starter motor circuit forms a part influenced by the ignition lock mechanism.

The method, and the device for utilizing the method according to the present invention, is based on a completely different and novel method, but could basically be regarded as an improvement of the protection for the ignition circuit. The possibility of by-passing is completely eliminated, as well as the possibility to of removing the device according to the invention for an unauthorized person. It is easily understood, that the possibility for unauthorized use is hereby completely eliminated, and that previously known theft protection means do not have this security.

An embodiment of a device according to the method in respect of the present invention is more fully described below with reference to the enclosed drawings, and the mainly characteristic features of the method according to the present invention, and for the device according to the method, are disclosed in the following descriptive part of the specification and the claims.

FIG. 1 is a cross-sectional view of an embodiment of a device according to the method disclosed in the present invention, attached to the cylinder head of a combustion engine.

FIG. 2 is a plan view from above of the device as shown in FIG. 1, the surrounding tubular part being shown in cross-section at a point below the horizontal closed portion of the tubular part.

Figure 3:
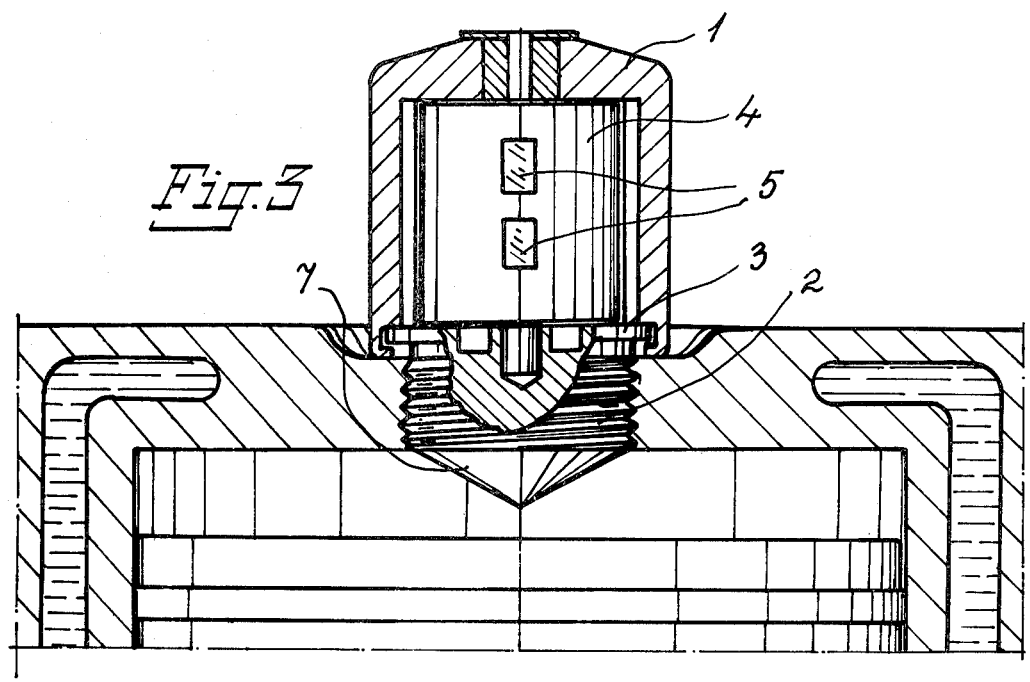
FIG. 3 is a cross-sectional view corresponding to FIG. 1 with the device in the locked position which prevents removal of the device by unauthorized persons.

With reference to FIG. 1, reference numeral 1 indicates a surrounding tubular member, rotatably connected to an attachment member 2 having an external screw thread. Said attachment is in the shown embodiment accomplished by means of an internal groove arranged in the lower part of the tubular member 1, which by means of a spring ring 3 is attached to a corresponding external groove in the upper portion of the attachment member 2. The method to join the tubular member 1 and the attachment member 2 can obviously be varied in a large number of previously known ways, e.g. by arranging the attachment member 2 with an external surrounding flange and the tubular member 1 with a groove by the internal free edge portion, whereafter the tubular member 1 is attached rotatably with the surrounding flange of the attachment member 2, e.g. by means of deformation. Further variations in the method to accomplish said attachment are previously well known and therefore not discussed.

The tubular member embraces a locking mechanism 4, arranged with a number of locking members 5, 5', 5", which are arranged to interlock with co-operating interlocking means, such as grooves or similar, arranged both at the inside peripheral part of the tubular member 1 and the surface facing the locking mechanism 4 of the attachment member 2.

In FIGS. 1 and 2 are the device shown with the locking members 5, 5', 5" arranged in a position extending away from the locking mechanism 4, i.e. in interlocking contact with both the tubular member 1 and the attachment member 2. Said members, 1 and 2, are thus joined to each other in a non-rotatable or movable relationship, which makes it possible to transfer a rotating movement from the tubular member 1 to the attachment member 2. The tubular member is in the shown embodiment arranged with an external hexagonal shape, which makes it possible to attach a conventional spanner of spark plug type.

Said embodiment is attached to the cylinder head of a combustion engine in the following manner. First is a spark plug, attached to the cylinder head, removed, whereafter the device, with the locking mechanism 4 in such a state that the locking members 5, 5', 5" are arranged in a position corresponding to FIGS. 1 and 2, is screwed into the cylinder head in a way corresponding to a spark plug. When the device has been attached in a described manner, the locking mechanism 4 is influenced by means of a key 6 (only partly shown) in such a way, that the locking members 5, 5', 5", are retracted to a position embraced by the locking mechanism 4, as shown in FIG. 3. The tubular member 1 is thus "released" from the attachment member 2, as well as the locking mechanism 4 from both the tubular member 1 and the attachment member 2. The device can hereby not be removed from the cylinder head, since both the tubular member 1 and the locking mechanism 4 freely can be rotated in relation to the attachment member 2. The engine can now not be used, since there is no possible way to attach a spark plug.

In FIGS. 1 and 3, the portion of the attachment member 2 directed towards the the piston in the engine is shown as a pointed member 7, in order to accomplish deformation of the piston in the engine in connection with unauthorized attempts to start the engine with the device attached. Said deformation prevents the piston from running and functioning as desired in the cylinder, but also obviously a damage that will require repair and thus repair costs.

Figure 4:
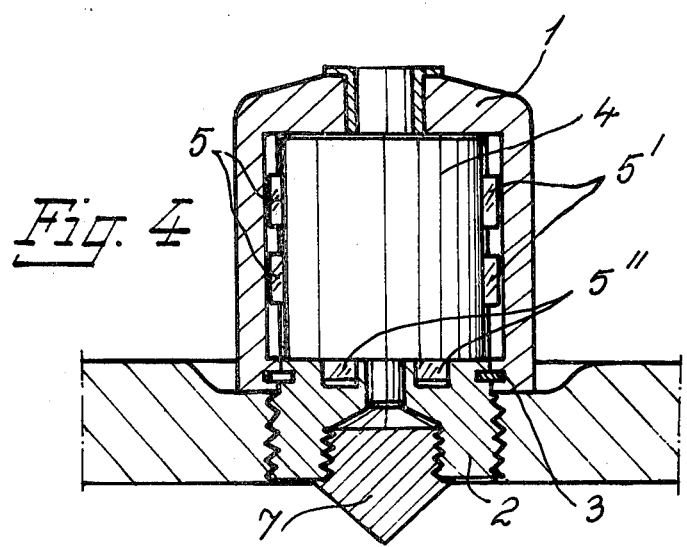
FIG. 4 is a cross-sectional view corresponding to FIG. 1 of a slightly modified embodiment of a device for utilizing the method according to the present invention.

An alternative embodiment is shown in FIG. 4, according to which the pointed portion 7 is arranged with a threaded part, arranged to faciliate attachment to a hole with a corresponding internal screw thread arranged in the attachment member 2. Hereby it is possible to choose whether or not this extra theft preventive means should be used or not, which can be regarded as necessary in certain cases, e.g. if the device is used to replace one spark plug only in a multi-cylinder engine such as 4-, 6- or 8-cylinder engines, in which cases the engine can function with low efficiency even if one spark plug is missing. The pointed part can be dismissed for multi-cylinder engines, provided that two or more devices according to the present invention are attached.

The shown and described embodiment, with modification according to FIG. 4, is only intended to serve as an example of an embodiment within the scope of the present invention, which method basically comprises of the use of a lockable device attached in position of a removed spark plug or a number of spark plugs in a combustion engine, which permit alternatively a locked, and a rotatable joint with an attachment member having an external screw thread corresponding to the external thread of the removed spark plug. The tubular member is also preferably arranged with an external shape corresponding to the portion of the spark plug used for interlocking purposes with a tubular spanner of spark plug type, whereby attachment, and removal, can be carried out using conventional tools, provided that the locking mechanism has been brought to unrotatably join the attachment member and the tubular member.

The locking members 5, 5', 5", forming a part of the locking mechanism 4, are preferably arranged spring-loaded in such a way, that a locking movement by means of the corresponding key 6 causes the locking members 5, 5', 5" to take up contact with the inside peripheral surface of the tubular member 1 and the upper plane of the attachment member 2 respectively, so that the locking members interlock with respective part, 1 and 2, as soon as the tubular member has been rotated to such a position, that the locking members 5, 5', 5" can interlock with the co-acting interlocking means arranged in the members 1 and 2 respectively.

The tubular member 1 is also preferably manufactured from a material with high resistance against applied outside force, e.g. hardened steel or carbide steel. Thus all attempts to bring the device out of order by means of forces applied to the tubular member 1 are effectively prevented.

It should also be emphasized, that the shown embodiment can be modified in a large number of ways, without departing from the important and characteristic features of the method according to the present invention.

Thus, it is possible in certain cases to arrange the locking mechanism 4 attached to either the tubular member 1 or the attachment member 2, having locking members 5, 5', 5", which can take up an interlocked relationship with the remaining member.

Also many other embodiments are possible within the scope of the inventive thought and the following claims.

We claim:

1. A device to prevent unauthorized use of combustion engine driven vehicles, ships, equipment, as well as engines only, characteristic thereof, that at least one spark plug arranged at an engine is removable and replaceable by a member having an outside portion with an external screw thread corresponding to the attachment screw thread of the spark plug, said member being joined by means of a locking mechanism to a member having means for interlocking purposes with a tool intended to faciliate attachment of the threaded member to the cylinder head of the engine, said locking mechanism being arranged to release at least the the member surrounding the locking mechanism from the threaded member, when in locked position, thus faciliating free rotation of the surrounding member in relation to the threaded member attached to the cylinder head of the engine.

2. A device according to claim 1, characteristic thereof, that both the locking mechanism and the surrounding member are freely rotatable in relation to each other, as well as the threaded member, when the locking mechanism is in locked position.

3. A device according to claim 1, characteristic thereof, that the threaded member is rigidly, or detachably, joined to a member protruding into the cylinder in direction towards a piston in said cylinder of the engine, arranged to deform, completely or partly, said piston during a piston movement in direction towards said protruding member.

4. A device according to claim 1, characteristic thereof, that it comprises an attachment member (2) having an external screw thread corresponding to the attachment screw thread of a spark plug, turnably or rotatably joined to a tubular member (1) arranged with means for attachment of an associated tool, a locking mechanism (5), preferably arranged embraced by said tubular member (1), said mechanism being arranged to either join the tubular member (1) and the attachment member (2) into a nonrotatable or rotatable relationship to each other, when said mechanism is manipulated with a relevant key (6).

5. Device according to claim 4, characteristic thereof, that said locking mechanism (5) is arranged with one, or a number of, locking members (5, 5', 5"), arranged to co-operate with interlocking means arranged in the tubular member (1) and/or the attachment member (2).

6. Device according to claim 4, characteristic thereof, that the tubular member (1) is arranged to mainly totally embrace the locking mechanism (4) and the attachment member (2) with regard to the portions directed away from the attachment screw thread of the attachment member (2).

7. Device according to claim 4, characteristic thereof, that the tubular member (1) is turnably or rotatably connected to the attachment member (2) by means of a spring ring (3) connecting said members (1, 2).

8. Device according to claim 4, characteristic thereof, that the tubular member (1) is turnably or rotatably connected to the attachment member (2) by means of permanent deformation.

9. Device according to claim 4, characteristic thereof, that the tubular member (1) is manufactured from a material with high resistance against applied outside forces, e.g. hardened steel, carbide steel or similar.

10. Device according to claim 4, characteristic thereof, that the locking members (5, 5', 5"), forming a part of the locking mechanism (4), are arranged to take up a springloaded position in contact with adjacent surfaces when the locking mechanism (4) is influenced, or alternatively, when the locking mechanism (4) is influenced, to move away from an interlocked position with the tubular member (1) and/or the attachment member (2).

11. Device according to claim 4, characteristic thereof, that the attachment member (2) is arranged with a preferably pointed part (7) directed from the tubular member (1), arranged to deform a piston in an engine to which the device is attached, in connection with that the piston is moved in direction towards said part (7).

12. Device according to claim 11, characteristic thereof, that said part (7) is detachably arranged in relation to the attachment member (2) by means of a screw thread connection or similar, in order to faciliate removal of said part when a deformation of the piston means is not desired.

* * * * *